Patented Sept. 18, 1945

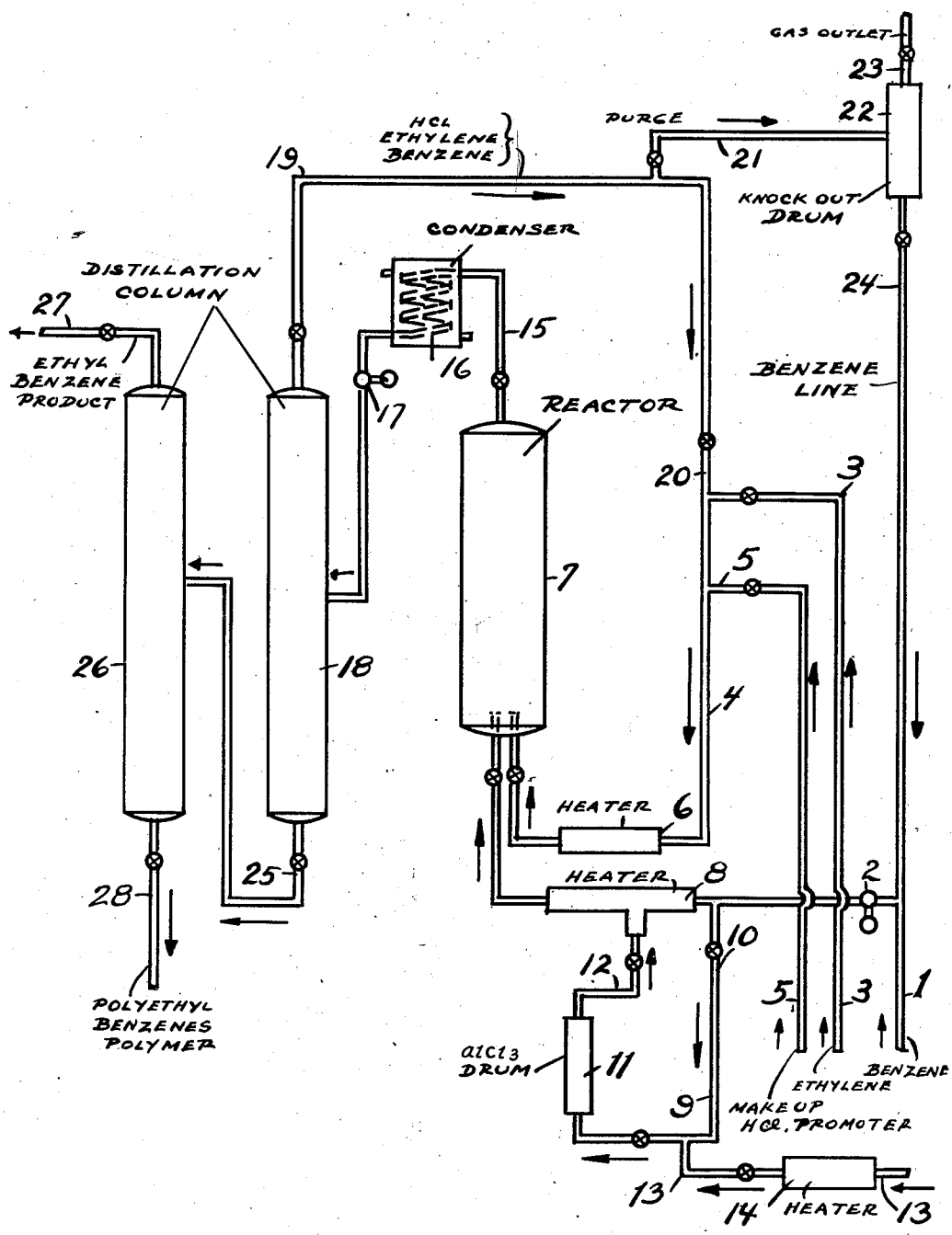

2,385,187

UNITED STATES PATENT OFFICE 2,385,187

SYNTHESIS OF ETHYL BENZENE

Forrest H. Blanding, Elizabeth, N. J., assignor to Standard Oil Development Company, a corporation of Delaware Application August 22, 1942, Serial No. 455,702

3 Claims. (Cl. 260—671)

The present invention relates to the ethylation of aromatic hydrocarbons and in particular, ethylation of benzene by means of Friedel-Crafts type catalyst, in particular the aluminum halides such as aluminum chloride, while carrying out the reaction under reaction conditions and in the presence of promotional amounts of halogen-containing compounds.

In the ethylation of aromatic hydrocarbons such as benzene, it is customary to employ catalysts of the Friedel-Crafts type such as, for example, zinc chloride, aluminum chloride, aluminum bromide, iron chloride and the like, in conjunction with one or more promoters such as, for example, hydrogen, chlorine, bromine, hydrogen chloride, hydrogen bromide, carbon tetrachloride, chloroform, the lower alkyl halides such as, for example, methyl, ethyl, propyl, butyl chlorides and bromides and the like. Small amounts of water have also been employed for promoting this reaction and therefore some superatmospheric pressure was sometimes used to maintain the liquid phase operation. However, the difficulties encountered in liquid phase operation have made it expedient to consider and perfect a process employing vapor phase operation in which a solid bed of catalyst, for example aluminum chloride impregnated or deposited upon suitable carriers, either reactive to some extent or inert, is employed and in which aromatic hydrocarbon vapors together with promoter are allowed to pass through and in intimate contact with the bed under reaction conditions.

The present invention is concerned with the vapor phase ethylation of benzene. The catalyst employed is prepared by impregnating aluminum chloride or other suitable Friedel-Crafts type catalyst on or into highly absorbent carrier substances to be more fully hereinafter described. In preparing these catalyst masses it has been found desirable, and in fact essential, to a smooth and economical operation obviating the necessity for frequent plant shutdowns, to impregnate or sorb on or in the carrier substance only sufficient aluminum chloride as will be tenaciously held in the pores of the carrier substance under the conditions of ethylation obtaining. This is expedient by reason of the fact that aluminum chloride vapors when present to any great extent in the reacted effluent from the ethylation reactor tend to condense and deposit in valves, pipes, stills and the like, necessitating the removal and shutdown for cleaning of these various pieces of equipment. Although it is preferred to make up the catalyst mass so that only tenaciously held aluminum chloride is present in the pores of the carrier, the invention is not restricted to the use of this particular type of catalyst mass but is likewise applicable to the case where aluminum chloride is present in excess of the amount required to be only tenaciously held in the pores of the carrier, in which case provision is made for the removal of the excess aluminum chloride vapors by their sorption in another mass of carrier or the like.

The present invention is concerned with the maintenance of the effective usefulness of the catalyst mass over a longer period of time than has heretofore been possible. This may be accomplished by introducing either intermittently, continuously, or continuously-intermittently, vapors of aluminum chloride or other suitable Friedel-Crafts type catalyst into the catalyst mass which is catalyzing ethylation reactions. This may be accomplished in a number of ways to be more fully hereinafter disclosed. It has been found, however, that particularly with respect to the carrier, the effective life thereof is materially lengthened, and from the economics of the process a commercial plant may be efficiently operated by employing the improvements herein described.

It is an object of the present invention to maintain a longer effective usefulness with incident high catalytic activity of an ethylation catalyst bed, particularly in connection with its use in the vapor phase ethylation of benzene. It is a further object of the present invention to carry out a continuous commercial process for the production of high yields of ethyl benzene from the corresponding ethylene and benzene as economically as possible and to avoid the necessity for shutdowns due to excessive degradation of the catalyst bed and/or plugging of the valves and lines with aluminum chloride deposited thereon and therein which was caused by the fact that excessive amounts of aluminum chloride were vaporized or dissolved in the effluent coming from the ethylation reaction zone.

It is a further object of the invention to add and substantially completely sorb aluminum chloride or other Friedel-Crafts type catalysts in vapor form to a catalyst bed to lengthen its effective catalyst life, and yet to add these vapors in such a way as to prevent substantial loss of aluminum chloride from said bed through vaporization or solution in the reacted effluent coming therefrom. It is a further object of the invention to maintain a substantially uniform distribution of aluminum halides or other Friedel- Crafts type catalyst, particularly aluminum chloride, throughout the sorbent carrier mass. It is a further object of the invention to maintain a maximum life for the sorptive carriers employed in making up the ethylation catalyst bed.

In order to accomplish these objects as well as others which will hereinafter appear upon a fuller and more complete understanding of the invention, the following description and explanation of the novel process follows.

Aluminum chloride or other suitable Friedel-Crafts type catalyst is impregnated on and sorbed in the pores of a relatively highly porous carrier such as, for example, activated carbon, diatomaceous earth, acid-treated clays such as, for example, Super Filtrol, the bentonitic clays, montmorillonite, bauxite, either partially or substantially completely dehydrated such as Porocel, Activated Alumina, alumina gel, silica gel, alunite and the like, and the mixture heated to an elevated temperature, depending upon the particular carrier employed, sufficient to complete the sublimation of the less tenaciously held aluminum chloride, for example, followed by a removal of all excess or extraneously and loosely held aluminum chloride from the porous mass. The temperature under which this may be carried out is generally from 50° F. to 100° F. in excess of the highest temperature to be employed in the ethylation reaction in which the catalyst mass will be employed.

Still another method of preparing the catalyst bed is to take a suitable highly sorbent carrier of the type heretofore specified and to independently sublime or vaporize aluminum chloride and by means of a suitable carrier gas or vapor, impregnate the porous carrier with the aluminum chloride until such time and in such amounts so that the carrier is substantially completely saturated with the aluminum chloride vapors and no further sorption thereof is possible under the particular temperatures maintained. The temperatures employed may be those of the ethylation reaction or 50° to 100° F. higher than the highest temperature to be contemplated for use in the subsequent ethylation reaction zone. Generally a temperature between about 275° to 350° F. is employed where vapor phase ethylation of benzene is contemplated. In preparing a catalyst for ethylation of benzene, temperatures of from 250° to 450° F. are generally desirable for the impregnation step. The amount of aluminum chloride contained in the pores of sorptive carriers varies depending upon the particular sorptive carrier employed, but in general it will be found to range between about 8% and about 15% by weight of the catalyst mass. The aluminum chloride vapor carriers employed may be of widely varying characteristics but it is only necessary that they be gases at or above the sublimation temperatures employed for the aluminum chloride and that they be relatively inert with regard to the aluminum chloride under the conditions employed for impregnation of the aluminum chloride on porous carriers. Such gases as benzene, nitrogen, air, carbon dioxide, hydrogen, chlorine, hydrogen chloride, methane, ethane, propane, normal butane or isobutane and the like may be, either singly or in admixture with one another, employed for this purpose. The impregnation of the porous carriers may also be carried out by dissolving aluminum chloride in a liquid such as butane or benzene, and adding to the porous carriers.

One of the particularly desirable carriers which have been employed is known under the trade name of Porocel and comprises a calcined bauxite. However, for best activity it is desirable to dehydrate this calcined bauxite, or any other carrier, to a point substantially below that where water is given off under the ethylation conditions to which the carrier subsequently is subjected. The bauxite may be dried and calcined by any of the customary methods employed. The particular calcined bauxite which is preferred in the present invention is Porocel which has been previously heated for a period of about 18 hours at a temperature between about 950° and about 1000° F. As previously stated, one of the methods of preparing the catalyst is simply to charge the ethylation reactor with the dehydrated Porocel alone and to impregnate and sorb aluminum chloride directly therein, or the Porocel may be impregnated with anhydrous aluminum chloride in a separate and independent step and the resultant catalyst may be charged into the ethylation reaction zone.

The feed stock employed in conjunction with this catalyst is benzene which is also useful as a carrier medium for the introduction of further quantities of aluminum chloride into the catalyst bed simultaneously with the ethylation reaction.

The ethylation reaction is carried out in the presence of suitable promoters, as heretofore mentioned. These are customarily employed in amounts ranging between about 1% and about 18% based on the quantity of benzene and ethylene, although higher amounts may be employed without deleterious effects on the ethylation reaction. Oftentimes it is desirable to employ higher amounts of promoter, particularly where these promoters such as chlorine, hydrogen chloride and/or hydrogen, serve as the carrier medium in introducing the further quantities of aluminum chloride into the catalyst mass since by regulating the amount of carrier gas it is possible to regulate the amount of aluminum chloride being introduced into the catalyst bed.

Times of contact vary, particularly in continuous units, but in general the time of contact will be between 0.2 and about 3 liquid volumes of feed stock per volume of catalyst per hour (30 to 600 seconds) and the temperature maintained in the reaction zone varies between 250° and 400° F., preferably between 275° to 350° F., while maintaining a pressure between atmospheric and 350 lbs. per square inch. When ethyl benzene and polymer are to be separated from hydrogen chloride, ethylene, and benzene in a stripping tower and the hydrogen chloride, ethylene, and benzene recycled to the reaction zone, a maximum pressure that will permit vapor phase operation is used.

These various reaction conditions are necessarily correlated with respect to one another for in the ethylation of benzenes where the boiling points of benzene and ethyl benzene are 176 and 277° F. respectively, the reaction temperatures may be varied from 275° to 350° F. Furthermore, the temperatures may be increased to some extent as the catalyst mass becomes degraded beyond a point where additional introduction of aluminum chloride to the catalyst mass does not maintain its activity. In such a case the temperature is raised and the reaction conditions are made slightly more drastic for a given feed stock in order to attain the greatest yield of desired product per unit of weight of aluminum chloride charged to the catalyst mass.

It has also been found expedient in carrying out a commercial operation of this type, to subject the feed stocks, ethylene and benzene, to a pretreatment with a suitable agent for the removal of water if it is present in objectionable quantities. For example, activated charcoal, clay or bauxite may be employed, as well as other substances commonly employed in such treatments. This pretreatment is best carried out in liquid phase operation in which the feed stock is maintained in liquid state through the clay filter treatment. The clay filter treatment of course may be omitted if the feed stock does not contain any appreciable amounts of water to cause any appreciable disturbance of the activity of the aluminum chloride in the subsequent ethylation reaction.

The feed stock is subjected to sufficient heating to vaporize the same under the pressures obtaining and its temperature is subsequently adjusted in accordance with a number of factors. In the first place, the temperature is generally adjusted to that desired to be maintained in the reaction zone. This may be accomplished in two ways. In the first method, benzene is heated to the desired reaction temperature and passed into a chamber containing granular or comminuted aluminum chloride with such velocity as to vaporize and pick up the desired amount of aluminum chloride, and this aluminum chloride is introduced into the reaction zone. However, a second method is also contemplated in which only a portion of the benzene is carried through the aluminum chloride pick-up chamber and the remaining portion of the benzene vapors are by-passed directly to the ethylation reaction zone with a cooling or heating thereof in order to adjust the temperatures to the desired reaction temperatures. Cool liquid benzene may be added to the aluminum chloride in a drum and then vaporized and the vapors passed to the ethylation reaction zone. Still a further embodiment of the process of the invention resides in admixing a portion of the promoter such as, for example, hydrogen chloride and/or chlorine and/or hydrogen with benzene and conducting the mixture in whole or in part, as before, through the aluminum chloride pick-up drum where the aluminum chloride vapors are carried by these gases and vapors to the ethylation reaction zone for sorption in the catalyst mass under the ethylation reaction conditions. It has been found that once the ethylation catalyst mass has attained a composition of aluminum chloride therein between about 8% by weight and about 20% by weight, depending upon the carrier used, it is sufficient in order to maintain its activity to have the vapors entering the reaction zone contain between about 0.005% and about 0.1% by weight of aluminum chloride based on the feed, preferably between about 0.01% and about 0.05% by weight. Actually, there is no necessity for limiting the amount of aluminum chloride vapors entering the ethylation catalyst bed except that the amount should not exceed that which can be substantially completely sorbed. The upper limit, therefore, is really fixed by the capacity of the sorbent carrier to take up the aluminum chloride vapors. It is generally not desirable to introduce aluminum chloride vapors in amounts over and above that which will be substantially completely sorbed. The reacted vapors leaving the ethylation zone should contain not more than about 0.004% by weight, based on the hydrocarbon feed, of aluminum chloride since under continuous operation higher amounts represent unsorbed and loosely held aluminum chloride contained in the ethylation catalyst bed which tend to eventually lead to the difficulties heretofore mentioned such as line plugging, valve sticking, etc. Liquid benzene at low (room) temperature could be used to pick up the aluminum chloride from the aluminum chloride pick-up drum and then be vaporized and admixed with the promoter in the reaction zone.

Still other variations of the method of introducing the aluminum chloride vapors into the ethylation catalyst bed are employed. The promoter such as, for example, hydrogen chloride, either alone or in conjunction with molecular hydrogen, may be used exclusively for picking up the aluminum chloride vapors and introducing them into the reaction zone, or these promoters may be introduced in the reaction zone admixed with that portion of the benzene which does not go through the aluminum chloride pick-up chamber.

No special type of apparatus construction is necessary in carrying out the process of the present invention. It is sufficient that equipment which has customarily been employed for vapor phase treatment of hydrocarbon with solid bed-type catalyst will serve to accomplish satisfactorily the present process. Ordinarily, reactors containing supported plates or baskets for the deposition of catalyst masses and through which vapors are allowed to pass may serve as the reactors. Since the process may be carried out under superatmospheric pressure the vessels should be of the ordinary pressure type. The reactors may be a single reactor or a plurality of reactors arranged in series or parallel so that the feed stock and the unit may be continuously onstream even through one or more reactors may be off-stream for removal of spent catalyst or its regeneration. It is preferred in the present operation to have more than one reactor and to have the reactor vertical in shape and to introduce the feed stock at the bottom thereof and allow it to flow through the catalyst mass upwardly and emerge from the reactor from the top. However, downflow operation is also possible. Multiple reactors may be employed, either in series or parallel. When it becomes necessary to discontinue the use of one catalyst mass, particularly in parallel operation, it may be cut off-stream and regenerated or replaced without interruption of the process. The reactors may also be jacketed in order to maintain their temperature, and convenient heat interchangers may be employed, particularly with respect to the introduction of the reacted effluent into the promoter stripping tower and the removal of the stripped reacted mixture therefrom.

Not only may the catalyst mass be maintained so far as its activity is concerned in the manner heretofore described, but it may likewise be prepared or regenerated in the same manner, that is, by the use of normal butane, for example, and/or hydrogen chloride or chlorine vapors and gases as carrier media for vaporized aluminum chloride which is introduced to reimpregnate or impregnate the Porocel or other absorbent carrier employed. In regenerating the catalyst mass it is suggested to remove substantially all carbonaceous impurities contained in the pores thereof by combustion using air or free oxygen, either undiluted or diluted, with an inert gas such as nitrogen, carbon dioxide, etc., to burn the carbonaceous material from the pores. It is then possible to reimpregnate the pores of the carrier with aluminum chloride vapors as previously described.

A preferred type of apparatus is illustrated by the drawing in which numeral 1 indicates the pipe provided with pump 2 through which benzene is passed into the reactor 7. Numeral 3 indicates the pipe through which ethylene is passed into pipe 4, where together with make-up hydrogen chloride promoter introduced by means of pipe 5 it is passed through heater 6 and into the lower part of the reactor 7. The benzene pipe 1 is also provided with a heater 8 before it is passed into the reactor 7. A by-pass pipe 9 is provided with valve 10 connected to pipe 1 which passes through an aluminum chloride drum 11 where it picks up aluminum chloride. It is then passed to pipe 12 through heater 8 into pipe 1. Another pipe 13 provided with a heater 14, may be used to pass hydrogen or any other inert gas as a carrier for aluminum chloride into pipe 1 and through aluminum chloride drum 11 into pipe 1. The reactor contains aluminum chloride impregnated on Porocel or other carrier. The two reacting materials, benzene or ethylene, are passed through the beds of catalyst and removed from reactor 7 by means of pipe 15, condensed in condenser 16 and by means of pump 17 passed into distillation column 18. In the distillation column hydrogen chloride, unreacted benzene and ethylene are removed by means of pipe 19 and may be recycled to the bottom of the reactor by means of pipes 20 and 4 or passed to pipe 21 to knock-out drum 22 where the inert low boiling gases such as nitrogen, hydrogen and methane are removed through pipe 23 and the benzene recycled through pipe 24 to pipe 1. The ethyl benzene formed and higher boiling compounds are removed from distillation column 18 by means of pipe 25 and passed to a second distillation column 26 where the ethyl benzene product is obtained overhead through pipe 27 and the polyethyl benzenes polymer removed as bottoms by means of pipe 28.

*Example*

Twelve parts of dried benzene are passed at room temperature through a chamber containing aluminum chloride, heated to 300° F., and passed to the bottom of a reactor containing a catalyst consisting of 12 wt. per cent of aluminum chloride impregnated on 88 wt. per cent Porocel. One part of anhydrous hydrogen chloride and 3 parts of dry ethylene are also heated to 300° F. and admitted to the bottom of the same reactor. Also the reactor is maintained at about 5 pounds per square inch pressure or less. The product gases coming from the reactor are cooled and fed to a fractionating column which separates the ethyl benzene and higher boiling polymers from the benzene, ethylene, and hydrogen chloride excess. The excess benzene, ethylene (a small amount) and hydrogen chloride, along with make-up hydrogen chloride and more ethylene, is recycled to the reactor. The ethyl benzene is separated from higher boiling alkylated benzenes and polymers in another fractionating column.

I claim:

1. The process of ethylizing benzene which comprises contacting ethylene and benzene in the vapor phase, at a temperature ranging from 250° F. to 400° F. in the presence of a porous sorptive carrier containing impregnated therein and thereon 8 to 20% of aluminum halide by weight of the catalyst mass while simultaneously introducing into the catalyst mass aluminum halide vapors carried by the hydrocarbon feed mixture.

2. A process of ethylizing benzene which comprises contacting ethylene and benzene in the vapor phase at a temperature ranging from 250° F. to 400° F., in the presence of a porous sorptive carrier containing impregnated therein and thereon 8 to 15% of aluminum chloride by weight of the catalyst mass while simultaneously introducing into the catalyst mass 0.01 to 0.05% aluminum halide vapors based on the hydrocarbon feed.

3. The process of ethylizing benzene which comprises contacting liquid benzene maintained below its boiling point with aluminum chloride, heating the benzene with the dissolved aluminum chloride at a temperature between 275° F. and 350° F., at a pressure not over 5 pounds per square inch, and contacting the hot benzene with the dissolved aluminum chloride, hydrogen chloride and ethylene with a catalyst mass consisting of 8% to 15% of aluminum chloride by weight of the catalyst mass impregnated on a highly absorbent carrier substance.

FORREST H. BLANDING.